UNITED STATES PATENT OFFICE.

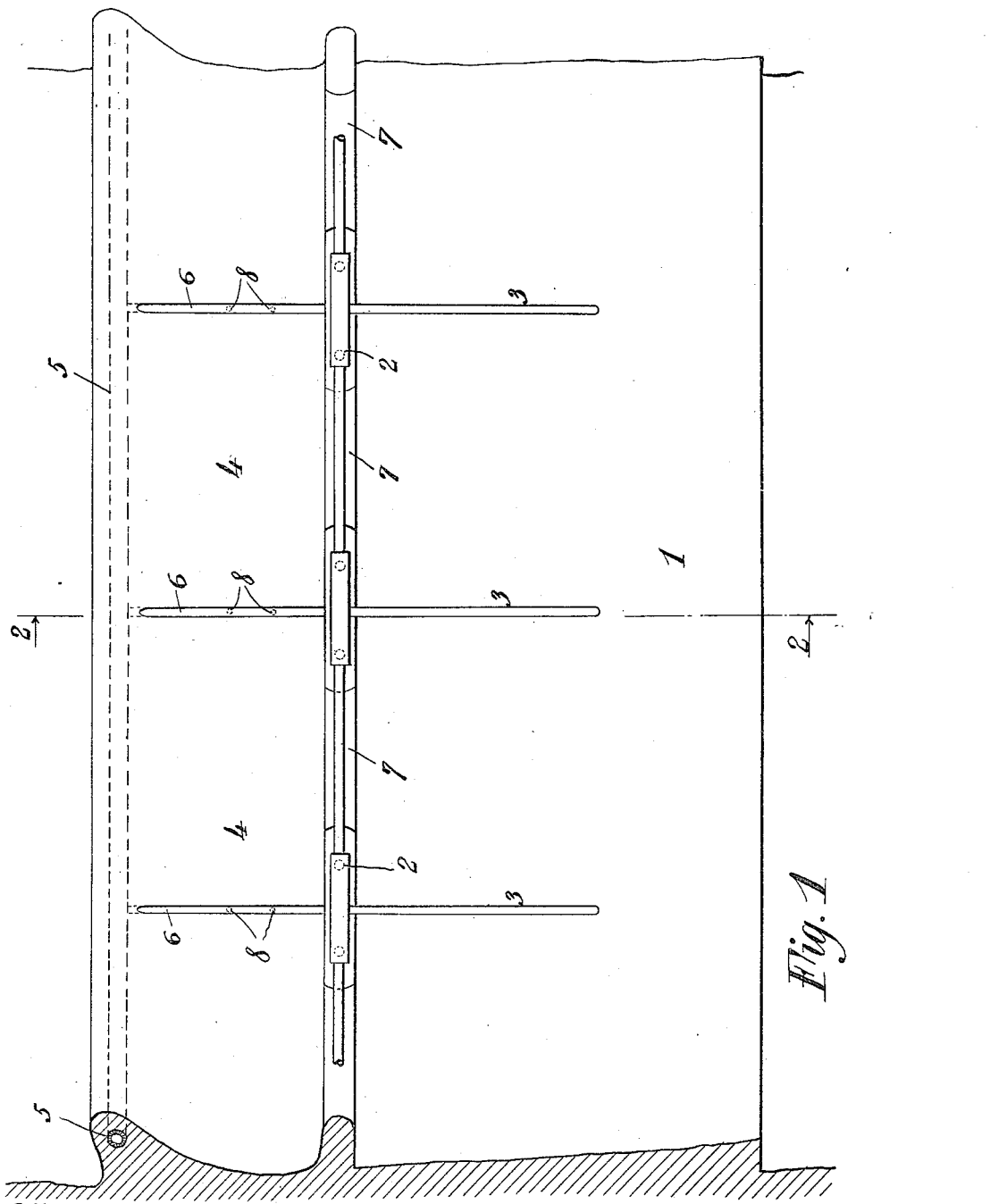

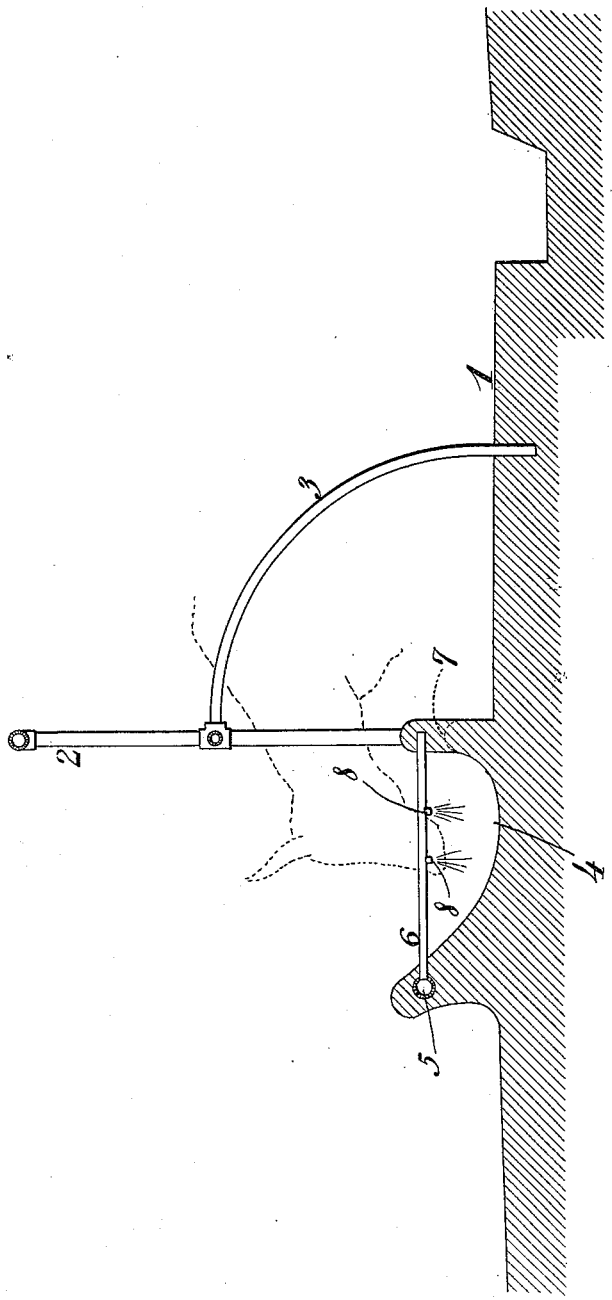

ALFRED HOPKINS, OF NEW YORK, N. Y.

DRINKING-TROUGH, &c.

1,144,129.  Specification of Letters Patent.  Patented June 22, 1915.

Application filed July 21, 1914. Serial No. 852,142.

*To all whom it may concern:*

Be it known that I, ALFRED HOPKINS, a citizen of the United States of America, residing at 318 East Fifty-fourth street, in the borough of Manhattan, city, county, and State of New York, have invented certain new and useful Improvements in Drinking-Troughs, &c., of which the following is a specification.

My invention relates to fixtures adapted for use in dairy stables and it consists, primarily in the combination with a clear trough of sufficient length to accommodate a plurality of animals, and crossbars for separating their individual parts of the trough of individual feeders for feeding water to said individual parts of the trough, and, as another feature, in employing the individual feeders as crossbars.

Sanitation is of great moment in dairy stables and it therefore becomes advisable to so construct the fixtures that they may be readily and easily cleansed, for it is axiomatic that if cleansing be difficult it will not be done as it should be, and then too, if difficult, it takes more labor to accomplish it.

It is unnecessary to state that a long smooth clear trough is more easily and quickly cleansed than a number of short troughs or a long trough with obstacles interposed in the course of its length. Again it is desirable that water should be supplied to each of a herd simultaneously, and also that as far as possible the water furnished to one animal should be used by that animal and not, after its mouthing by one, be passed on to another. Unsuspected diseases are thereby sometimes communicated from one animal to the entire herd.

I have devised an arrangement which enables me to secure the results which, as above noted, have long been considered desirable, but which have not heretofore been attained in the completeness and simplicity of my structure.

Figure 1 is a plan view of a device embodying my invention, showing a trough long enough to accommodate four animals provided with partitional crossbars, individual feeders, etc. Fig. 2 is a vertical, sectional view of such device, on line 2—2 of Fig. 1.

1 is the concrete floor of a dairy stable. 2 the stall stanchion, 3 the stall partition, 4 the trough, 5 the main feed pipe, 6 the individual crossbar feed pipe, 7 a concave curve in the trough, in front of each animal, 8 nipples screwed into the openings in the individual feed pipes.

The drinking water from any suitable source of supply, is led into the main feed pipe and flowing through it, to, into and out of the individual feed pipes, will fall into the trough at the respective divisional points, substantially as though each had a separate trough and feed. By properly adjusting the nipples, the delivery may be so controlled that the flow of water through each of the series of pipes 6, will be even and consequently the water will rise evenly in the trough and substantially without current. The simplest way of doing this is to make the openings larger in each succeeding crossbar, or each succeeding series of nipples, if nipples are used, progressing from the one nearest the intake. There will therefore be substantially no transfer of water from the part of the trough in front of the one animal to that in front of the others. Not only so, but as the supply will thus be furnished evenly, there will be no occasion for the herd to crowd or push toward the end of the trough whence the supply comes initially and there is thus better preserved to the animals that placid and satisfied mind that is conducive to the giving down of a generous installment of the best quality of milk of which the animal is capable.

It will be noticed that the individual feed pipes open above the trough, an arrangement which permits me to avoid the placing of any obstacles, such as tube openings, strainers or the like, in the trough itself, and this is of further moment when cleansing is to be done. Then the trough being one long, open, smooth faced structure, whose bottom is not obstructed by projections which would prevent convenient cleansing, it may be easily and quickly scrubbed, rinsed and the liquid used for that purpose removed at one end, indeed at almost any point, with much greater speed, completeness and ease than with other forms of structures since the brush end of a broom or other cleansing tool may readily be projected under the cross-bars, in sequence, to scrub the underlying spaces and force any dirt along toward the end of the trough.

As already indicated, it is thought best to provide some form of separation structure between the animals, not only between those parts of the floor 1 on which they stand, as is accomplished by the stall partition rods or tubes 3, but also between the locations occupied by their heads when they are drinking. This effectually prevents an ill-tempered animal from interfering with its neighbors. I provide this separating device by utilizing my individual feeders to also constitute separating cross-bars dividing one portion of the trough from another and am thus enabled to attain convenience, simplicity and economy by avoiding the multiplicity of parts which the use of other independent cross-bars would entail.

I claim—

1. In a structure of the class set forth, a drinking vessel, a plurality of cross-bars, adapted and set as described to divide a plurality of spaces capable of accommodating the heads of a plurality of animals, said cross-bars being constructed in the form of individual feed pipes with openings adapted to direct the water into the said drinking vessel, and a water conduit leading to said cross-bar feed pipes, all substantially as set forth.

2. In a structure of the class set forth, a drinking vessel, a plurality of cross-bars adapted and set as described to divide a plurality of spaces capable of accommodating the heads of a plurality of animals, said cross-bars being constructed in the form of individual feed pipes with openings adapted to direct the water downward into the trough, and a water conduit leading to said cross-bar feed pipes, all substantially as set forth.

3. In a structure of the class set forth, a watering trough provided with a plurality of cross-bars adapted and set as described to divide a plurality of spaces capable of accommodating the heads of a plurality of animals, said cross-bars being constructed in the form of individual feed pipes with openings adapted to direct the water into the trough, and a water conduit leading to said cross-bar feed pipes, together with means for regulating the proportionate flow of water through said respective cross-bars, individually, all substantially as set forth.

4. In a structure of the class set forth, a watering trough provided with a plurality of cross-bars adapted and set as described to divide a plurality of spaces capable of accommodating the heads of a plurality of animals, said cross-bars being constructed in the form of individual feed pipes with openings adapted to direct the water into the trough, and a water conduit leading to said cross-bar feed pipes, said trough being clear of obstacles on the inner sides and bottom, as set forth, and long enough to accommodate a plurality of animals, all substantially as set forth.

5. In a structure of the class described, a watering trough provided with a plurality of cross-bars adapted to divide a plurality of spaces capable of accommodating the heads of a plurality of animals, said cross-bars being constructed in the form of individual feed pipes with openings adapted to direct the water into the trough which is clear of obstacles on its inner sides and bottom and long enough to accommodate a plurality of animals and located below said cross-bars, and a water conduit leading to said cross-bar feed pipes, all substantially as set forth.

6. In a structure of the class set forth, a trough provided with a plurality of cross-bars adapted and set as set forth, to divide a plurality of spaces capable of accommodating the heads of a plurality of animals, said cross-bars being constructed in the form of individual feed pipes with openings adapted to direct the water into the trough which is clear of obstacles on the inner sides and bottom as set forth, located in position to receive the water issuing from said cross-bars, and long enough to accommodate a plurality of animals, and a water conduit leading to said cross-bar feed pipes, together with means as set forth for regulating the proportionate flow through the respective cross-bars, all substantially as set forth.

In testimony whereof, I have signed my name to this specification in the presence of two subscribing witnesses, this 11th day of July 1914.

ALFRED HOPKINS.

Witnesses:
 H. M. May,
 H. E. Reeves.

Copies of this patent may be obtained for five cents each, by addressing the "Commissioner of Patents, Washington, D. C."